(12) United States Patent
Klabunde et al.

(10) Patent No.: US 8,702,568 B2
(45) Date of Patent: Apr. 22, 2014

(54) EXERCISE SYSTEM AND A METHOD FOR COMMUNICATION

(75) Inventors: Karin Klabunde, Bochum (DE); Lucas Jacobus Franciscus Geurts, Eindhovenseweg (NL)

(73) Assignee: Koninklijke Philips N.V., Eindhoven (NL)

( * ) Notice: Subject to any disclaimer, the term of this patent is extended or adjusted under 35 U.S.C. 154(b) by 265 days.

(21) Appl. No.: 13/203,014

(22) PCT Filed: Feb. 19, 2010

(86) PCT No.: PCT/IB2010/050739
§ 371 (c)(1),
(2), (4) Date: Aug. 24, 2011

(87) PCT Pub. No.: WO2010/097739
PCT Pub. Date: Sep. 2, 2010

(65) Prior Publication Data
US 2011/0306469 A1    Dec. 15, 2011

(30) Foreign Application Priority Data
Feb. 26, 2009  (EP) .................................... 09153692

(51) Int. Cl.
*A63B 24/00* (2006.01)

(52) U.S. Cl.
USPC ................... 482/8; 482/1; 482/9; 482/901

(58) Field of Classification Search
USPC ...................... 482/1–9, 900–902; 600/547
See application file for complete search history.

(56) References Cited

U.S. PATENT DOCUMENTS

| | | | |
|---|---|---|---|
| 6,211,799 B1 | 4/2001 | Post et al. | |
| 8,231,506 B2 * | 7/2012 | Molyneux et al. | 482/1 |
| 2005/0171451 A1 * | 8/2005 | Yeo et al. | 600/547 |
| 2009/0023391 A1 | 1/2009 | Falck | |

\* cited by examiner

*Primary Examiner* — Glenn Richman

(57) ABSTRACT

The present invention relates to an exercise system for giving feedback to a user thereof and to a method for communication between different devices in the exercise system. The exercise system comprises at least two body coupled communication modules (14) for forming a body area network and at least one exercise device (2) comprising at least one sensor (6), feedback means (8) and one of the at least two body coupled communication devices. The exercise system further comprises a processing unit (4) for collecting and processing user data from the at least one sensor (6) and output the processed data on the feedback means (8) via the body area network in order to give the user feedback on his exercise.

13 Claims, 1 Drawing Sheet

EXERCISE SYSTEM AND A METHOD FOR COMMUNICATION

FIELD OF THE INVENTION

The present invention relates to an exercise system for giving feedback to a user thereof. The exercise system comprises at least two body coupled communication modules for forming a body area network. The invention furthermore relates to a method for communication between the different devices comprised in the exercise system.

BACKGROUND OF THE INVENTION

Lately, there has been an increased awareness of the need to exercise and also for relaxation. This has lead to that the fitness industry has grown and especially the area of fitness equipment. Also the use of personal trainers is increasing. This is due to the fact that persons often want help and feedback during their training. However, the drawback of using a personal trainer is that it must be planned, i.e. it decreases any spontaneous training or relaxation.

Today there also exist a lot of devices that can give feedback to users that are exercising, such as pulse watches, GPS-watches, foot pods, etc. These devices usually consist of one central unit such as a watch and a measuring unit such as an Electrocardiogram (ECG) sensor or foot pod. Typically, the central unit and the measuring unit or units will communicate with each other by radio frequency (RF). If there is more than one sensor connected to the central unit this is often done in a wireless network. However, in practice, it might be difficult to set up such a network for users if they use a lot of different sensors. In the best cases all devices and sensors are from the same manufacturer and are already set up when the user buys the equipment.

The use of wireless networks, in which the signals propagate externally to the user have at least one drawback. Such a wireless network is usually configured to automatically search and connect to any new device in the range of thereof even if the device belongs to another user. Having wireless networks that use different frequencies sometimes solves this problem. However, if there are many users in a limited space there will certainly be problems with interference. It might also be that one user is able to pick up data from a sensor belonging to another user.

There is also a potential problem with body attenuation if a sensor is placed on the back of the body and it shall communicate with a central unit placed in front of the body. Furthermore, a typical wireless network has high power consumption.

However, even if the above-described devices for giving a user feedback would come without the entire mentioned drawback, it is still a big difference to having a personal trainer. A personal trainer can tell a user if he is performing an exercise with the right movements or with the right speed etc.

Hence, an improved exercise system for giving feedback to a user would be advantageous, and in particular a more power efficient and/or interference free exercise system where eavesdropping is difficult, i.e. privacy of users is protected.

SUMMARY OF THE INVENTION

Accordingly, the invention preferably seeks to eliminate one or more of the above-mentioned disadvantages singly or in any combination. In particular, it may be seen as an object of the present invention to provide an exercise system that solves the above-mentioned problems of the prior art with high power consumption, interference and feedback to a user.

This object and several other objects are obtained in a first aspect of the invention by providing an exercise system for giving feedback to a user thereof comprising at least two body coupled communication modules for forming a body area network and at least one exercise device comprising at least one sensor, feedback means and one of the at least two body coupled communication devices, a processing unit for collecting user data from the at least one sensor, processing the data and output the processed data on the feedback means via the body area network.

The invention is particularly, but not exclusively, advantageous for obtaining user specific feedback during exercise and relaxation.

These and other aspects of the invention will be apparent from and elucidated with reference to the embodiments described hereinafter.

BRIEF DESCRIPTION OF THE FIGURES

The present invention will now be explained, by way of example only, with reference to the accompanying figures, where.

DETAILED DESCRIPTION OF EMBODIMENTS

The exercise system according to the present invention comprises at least one exercise device 2, but preferably two or more. In context of the present invention the term exercise device 2 should be interpreted broadly and include devices such as but not limited to dumbbells, meditation balls or even ECG sensors. The important feature for all these exercise devices 2 is that they are able to give a user feedback during some kind of physical activity, also including relaxation.

Figure 1:
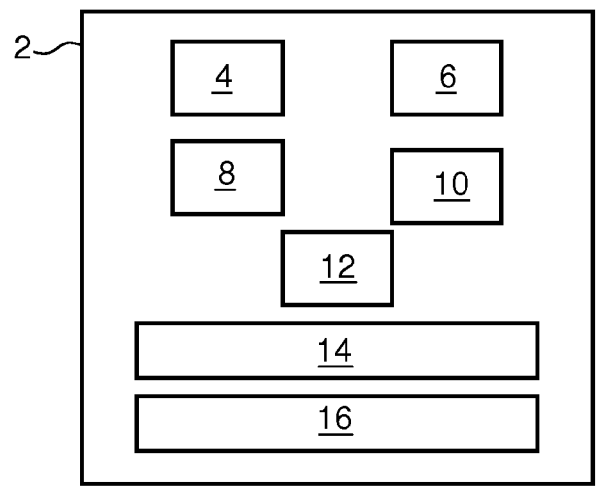
FIG. 1 is a schematic view of an exercise device, which is a part of the exercise system according to the present invention.

FIG. 1 is a schematic view of an exercise device 2, which is a part of the exercise system according to the present invention. The exercise device 2, according to FIG. 1, comprises a processing unit 4, at least one sensor 6, feedback means 8, a memory 10, a battery 12, a Body Coupled Communication (BBC) module 14, and a protocol stack 16.

BCC is a technology that uses the human body and the space a few centimeters around it as a communication channel. In short a BCC module 14 comprises a transmitter and a receiver that each has two conductive plates, one on the body and one in the air. The plates are used for propagating an electric field and form an electric circuit composed by the human body and by a return path (air and ground). All devices that have the BCC module 14 and that are on or around a user's body create a body area network. U.S. Pat. No. 6,211,799 describes a system for transmitting power and data through a user's body.

The sensor or sensors 6 that are provided in the exercise device 2 may be accelerometers, ECG sensors that are used for collecting data about either the movement and motion of the exercise device 2, or data about the user. By providing for example an accelerometer, the speed and direction of the exercise device may be decided, which may be used to provide the user with feedback of his training.

The feedback is given through feedback means 8, which for example may be Light Emitting Diodes (LEDs) or vibration engines or the like. It is also possible to give feedback to the user through a display or voice machine.

The memory 10 and processing unit 4 is used to run the application in each exercise device 2. The protocol stack 16 is used for enabling gathering and evaluation of collected data and to control the devices needed for giving appropriate feedback to the user. The protocol is set up to support the following functionality. Detecting other devices in the system, such as new or leaving devices. Detecting the properties of the other devices, such as sensors, actuators, processing units etc. Supporting exchange of data between devices. Negotiating roles of each connected device. Communicating feedback to the user by controlling actuators, LEDs etc.

The battery 10 is used to power the exercise device 2. The power consumption of devices using BCC modules is very low compared to devices connected to a wireless RF network.

Besides the at least one exercise device 2, the exercise system according to the invention comprises an evaluation and control unit, which is responsible for fine-tuning and controlling the user feedback. This control unit may be either be a part of an exercise device 2 or be a separate unit. The control unit may also be distributed between several different devices.

Figure 2:
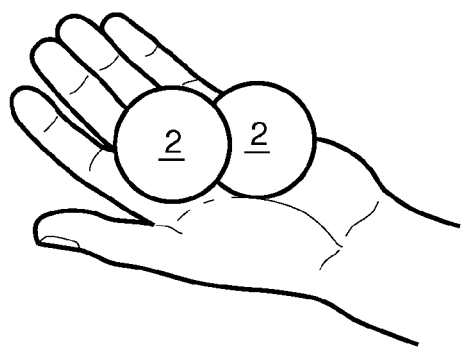
FIG. 2 shows two exercise devices in form of two meditation balls.

As mentioned above the exercise system comprises at least one, but preferably several exercise devices 2 and also the control unit. In an embodiment the exercise system comprises two exercise devices, having the form of two meditation balls, which are shown in FIG. 2.

The meditation balls 2 are inspired by Chinese Baoding balls. This exercise device comprises two meditation balls 2 and a charging dock. The purpose of the meditation balls 2 is to help a user to relax in a playful manner. The user can interact with the meditation balls 2 by making them orbit each other in the palm of his hand. The meditation balls 2 are configured to detect and analyze movements of the user in real-time and compare them to a number of internally stored, relaxing movement patterns. Based on how closely the movements of the user match the desired movement patterns, the light and vibration feedback pattern of each meditation ball 2 is changed.

First the movement of the user is often incoherent, and the feedback will be random. The closer the user matches a predetermined pattern the longer the user manages to sustain this match, the more structured and restful the feedback patterns will become.

In order to perform this task, both meditation balls 2 are equipped with an accelerometer 6, a BCC module 14, a memory 10, a processing unit 4, feedback means 8 in form of LEDs and vibration engines.

The processing unit 4 inside the meditation balls 2 analyses the movement patterns measured by the accelerometers 6 to determine the movement the user is making. These actual movements are compared in real-time to a number of internally in the memory 10 stored movement patterns believed to be relaxing. In an embodiment twenty LEDs per meditation ball 2 and a light line surrounding the base provides the feedback to the user. The intensity of the LEDs may be individually controlled. Haptic feedback may be given through the vibration engines in the meditation balls 2.

When in this embodiment, the two meditation balls 2 are removed from the charging dock they will start searching for other meditation balls 2 or other devices connected to the body area network (polling protocol) and exchange identities with each other. After discovery of other meditation balls 2 or devices the connected devices will agree on the roles they will have in the exercise system. In another embodiment the roles of each device is predetermined and hardcoded in each device.

After the identification and role phase the exercise system starts and will work as described above. One meditation ball 2 will regularly ask the other meditation ball 2 for its data and evaluate it together with its own data. As long as they are in contact with or in the vicinity of the body the meditation balls 2 may exchange information to detect and analyze the performance of the user. Depending on the performance different feedback will be given to the user, for example with light signals and/or with vibration. For this purpose the meditation ball 2 that is evaluating the data will send information to other meditation ball 2 to give appropriate feedback as well as displaying a corresponding feedback itself.

In an alternative embodiment the meditation balls 2 only regularly exchange their movement measurements and determine themselves how to react to the behavior of the user in order to give appropriate feedback via light and vibration.

Figure 3:
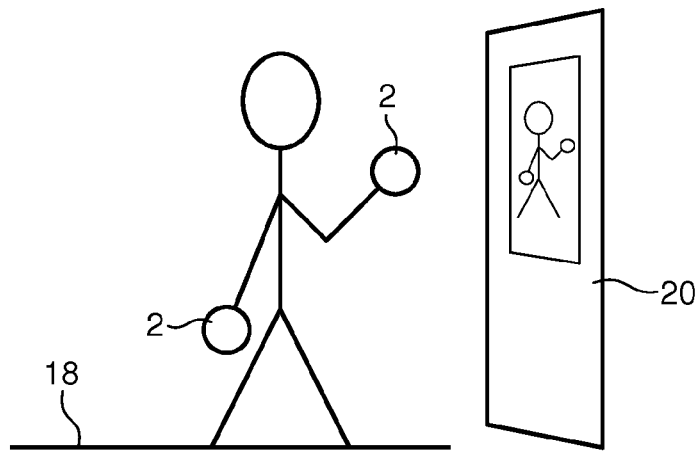
FIG. 3 shows a user exercising with two exercising devices and getting feedback from a display base.

In another embodiment, shown in FIG. 3, the exercise devices 2 are exercising weights instead of meditation balls 2. This exercise system comprises two exercising weights 2 which are powered by kinetic energy and remotely connected to a display base 20 that guides individuals step-by-step through a fitness exercises using a simple animation representing their own virtual coach.

This exercise system will work in a similar way as a real personal coach would. It proposes exercises adapted to the physical condition of the user and then, as time passes, it increases the challenges, keeping the user motivated by inviting the user to surpass earlier achievements. Before an exercise start, it may remind the user to adapt to the right posture—something as important as the exercise itself. As is evident to a person skilled in the art there are many, many options for how the virtual coach might work and that it might be designed according to user specifications.

In order to realize this exercise system the exercise weights 2 would be equipped with the BCC module 14, so that the communication via the body is enabled. To ensure communication with the display base 20, the display base 20 will also be able to receive messages via BCC. In an embodiment this will be achieved by a floor tile 18 having the BCC module 14 in front and connected to the display base 20. The communication between the three devices will be analogue to the message flow for the previous embodiment described in conjunction with the meditation balls 2.

The exercise system according to FIG. 3 may be a useful fitness system designed to help people who find the gym routine incompatible with their needs to stay fit and keep track of their fitness in the comfort of their own home.

The benefit with the present invention is that it allows for easy exchange of information between several devices connected to or close to a person's body. The interactivity between the different devices is, as mentioned above, enabled by BCC. According to the invention it is essential that that two or more BCC modules can communicate with each other, if they are in touch with or close (~10 cm) to the body of a person. No direct skin contact is required.

Furthermore, the possibility to identify the devices that are used during training/relaxation will make it possible to switch between different exercises programs depending on the type of devices that have been picked up by the user. For example, when picking up a different set of weights, a different exercise is proposed to the user.

It is also possible to identify who is currently performing the exercise. This allows offering an individual training program to the person just performing the exercise. For identification of the person there are many options. For example, may a person wear an explicit identification tag which can be read via BCC, e.g. in a wristband or integrated into a breast belt. Then the identification of the user may be read when the exercise is started. It is also possible to identify the user through a sensor, e.g. ECG sensor, integrated into one of the training devices. In this case the user would be identified by his/her heart signal. This, of course, requires a user registration and an extraction of his/her personal heart rate characteristics. It would also be possible to recognize a user by gesture (recognized by a camera). Each user could identify an own gesture previously.

The present invention also relates to a method for communication between different devices in an exercise system. As mentioned above each device comprises a body coupled communication module (14) for forming a body area network. The method is controlled by the control unit mentioned above and performs the following steps when a user starts it exercise, identifying all devices connected to the body area network, negotiating the roles for each device, collecting data from sensors 6 comprised in the different devices, exchanging data between the different devices, and communicating feedback to an user of the exercise system.

Thus, the present invention has been described and it will be clear to anyone skilled in the art that by using the present invention, the following advantages may be achieved. All devices connected to the body area network may easily communicate with each other, without any interference between devices/applications of different users, which are close to each other. The communication is highly reliable, as it is not hindered by body attenuation. The power required for driving this body area network is also very low compared to other technologies.

Although the present invention has been described in connection with the specified embodiments, it is not intended to be limited to the specific form set forth herein. Rather, the scope of the present invention is limited only by the accompanying claims. In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Furthermore, reference signs in the claims shall not be construed as limiting the scope.

The invention claimed is:

1. An exercise system for giving feedback to a user thereof comprising:
    at least two body coupled communication modules for forming a body area network;
    at least one exercise device comprising at least one sensor, at least one feedback device and one of the at least two body coupled communication modules; and
    a processing unit coupled via at least one of the at least two body coupled communication modules to the body area network for collecting user data from the at least one sensor, processing the data and controlling output of the processed data via the at least one feedback device.

2. An exercise system according to claim 1 where the system comprises two exercise devices and the processing unit is an integrated part of one of the exercise devices.

3. An exercise system according to claim 2 where the exercise devices comprise meditation balls adapted to fit in the palm of a hand.

4. An exercise system according to claim 1 where the system comprises a display for giving feedback to and coaching the user of the system and said display is connected to a floor plate comprising one of the at least two body coupled communication modules for connecting the display to the body area network.

5. An exercise system according to claim 1 where the at least one sensor comprises an accelerometer and the at least one feedback device comprises light emitting diodes.

6. An exercise system according to claim 1 where the system comprises an identification tag coupled to the body area network for identification of the user of the exercise system.

7. An exercise system according to claim 6 where the identification tag comprises an ECG sensor integrated into one of the exercise devices.

8. An exercise device as in claim 1 where the at least one feedback device is adapted to produce a user perceptible output representative of the processed data.

9. An exercise device as in claim 1 where the user data relates to at least one of the exercise device and the user of the exercise device.

10. An exercise device as in claim 3 where the meditation balls are configured to detect movements thereof by the user and the integrated processing unit is adapted to compare said movements to predetermined movement patterns.

11. An exercise device as in claim 10 where the processing unit controls the at least one feedback device to provide a user perceptible output responsive to the detected movements of at least one of the meditation balls.

12. A method for communication between a plurality of devices in an exercise system, at least one of said devices comprising an exercise device including a feedback unit, said method comprising:
    utilizing a body coupled communication module associated with each of said devices for forming a body area network;
    utilizing sensors associated with said devices to collect data relating to at least one of the exercise device and a user of the exercise device; and
    utilizing a processing unit associated with at least one of the devices for:
        identifying all of the devices connected to the body area network;
        negotiating roles for each of the connected devices;
        collecting data from the sensors associated with the connected devices;
        exchanging data between the connected devices; and
        controlling feedback, relating to the data, from the feedback device to the user of the exercise device.

13. A method as in claim 12 where the processing unit uses the collected data to analyze movement patterns of the user in performing an exercise.

* * * * *